E. G. ADAMS.
TRACTOR.
APPLICATION FILED MAR. 11, 1918.
1,282,667.
Patented Oct. 22, 1918.
5 SHEETS—SHEET 5.
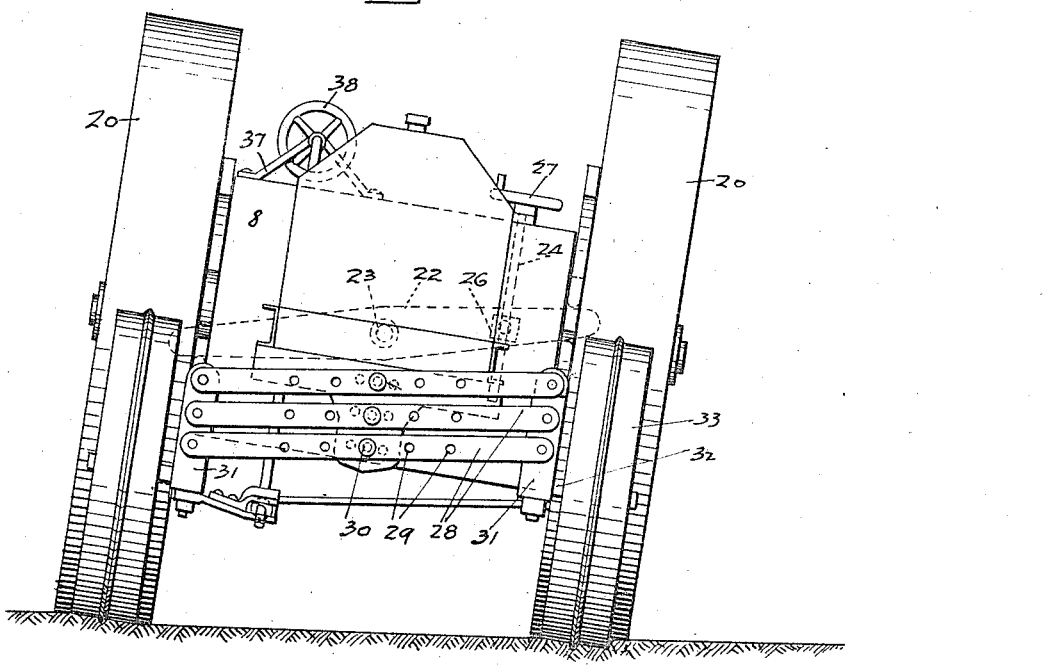
Fig. VII.
Edwin G. Adams, Inventor
By R. C. Wright
Atty

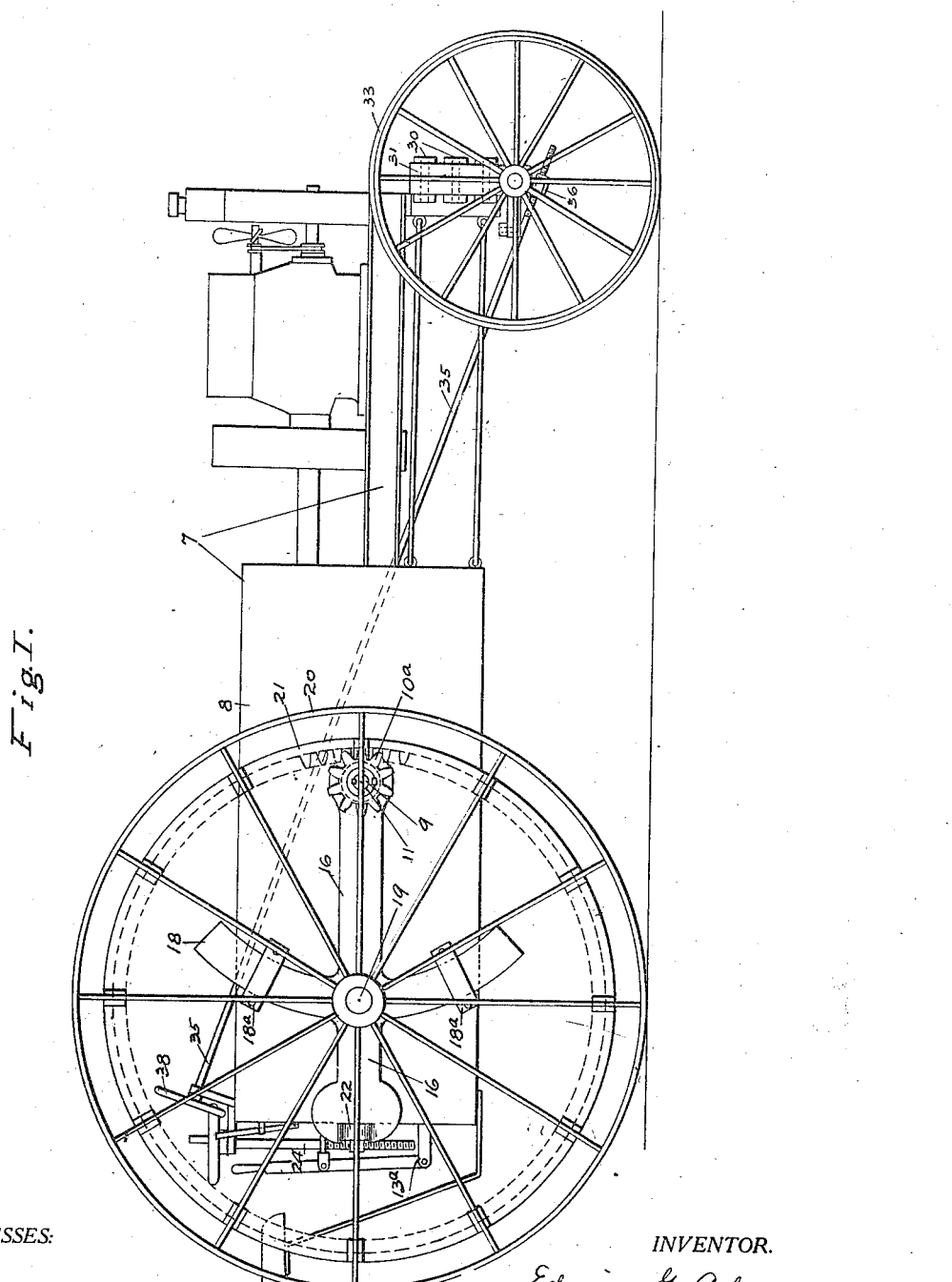

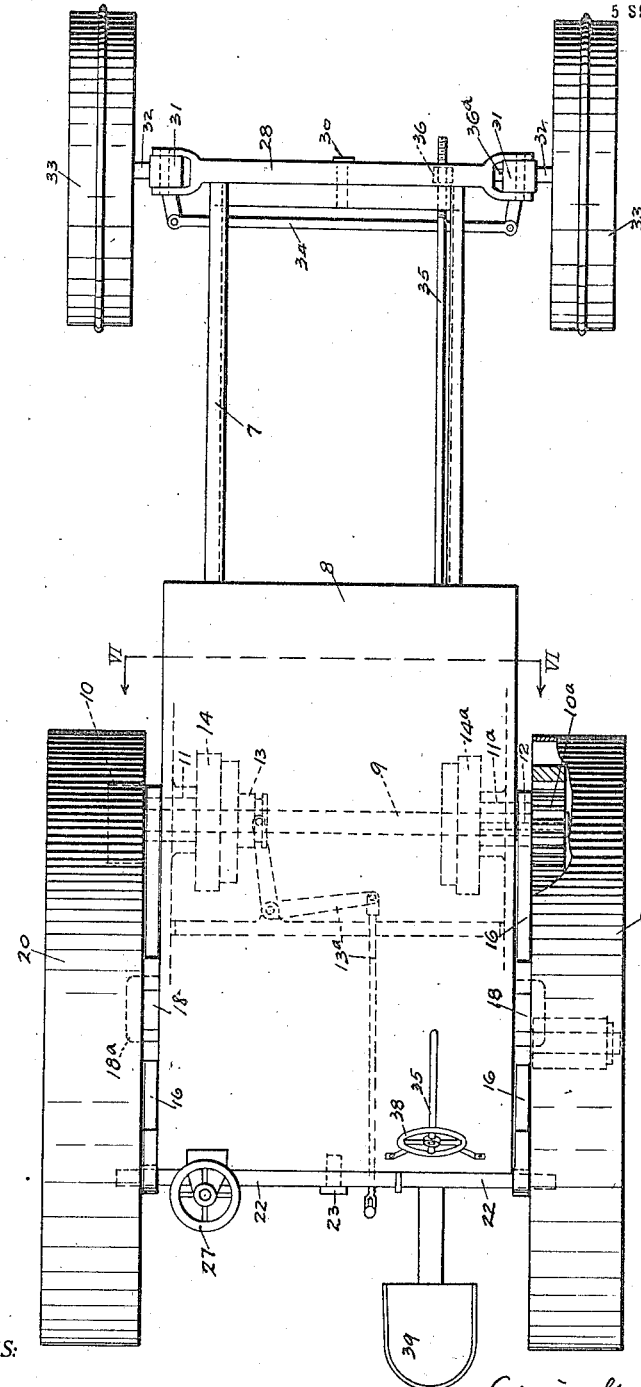

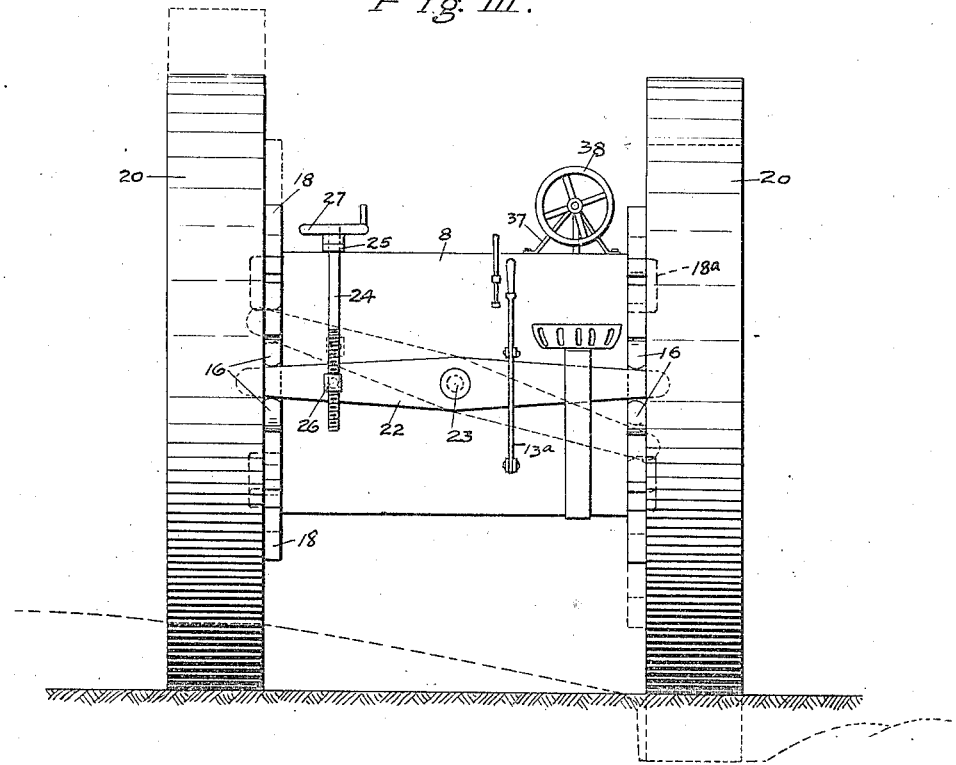
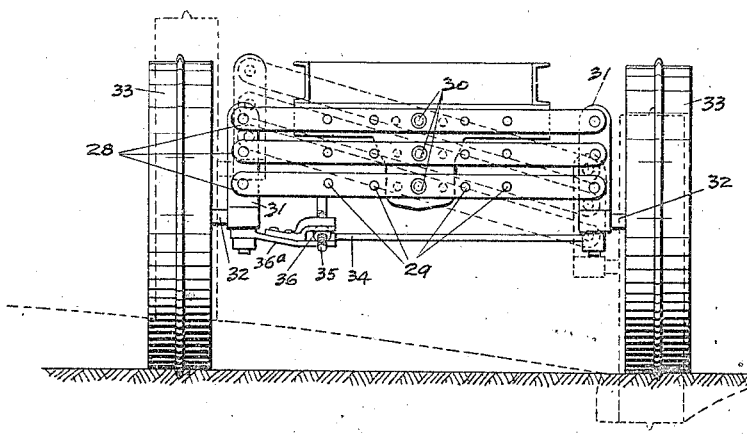

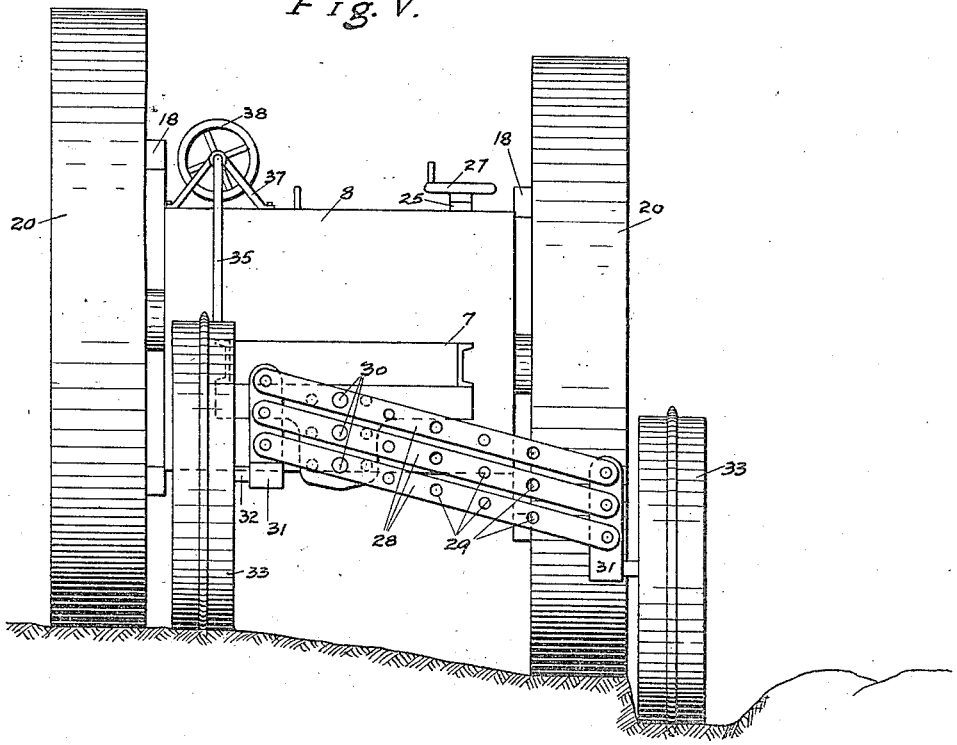

UNITED STATES PATENT OFFICE.

EDWIN G. ADAMS, OF McMINNVILLE, OREGON.

TRACTOR.

1,282,667.            Specification of Letters Patent.    Patented Oct. 22, 1918.

Application filed March 11, 1918. Serial No. 221,816.

*To all whom it may concern:*

Be it known that I, EDWIN G. ADAMS, a citizen of the United States, residing at McMinnville, in the county of Yamhill, State of Oregon, have invented a new and useful Improvement in Tractors, of which the following is a specification, reference being had to the accompanying drawings.

My invention relates to a class of devices used generally for drawing plows, but also for other traction purposes.

The object of my invention is to provide a tractor with mechanism therein to adjust the traction wheels vertically, as well as the forward wheels in the same manner, in order that they may be caused to run on different planes from each other. I accomplish these objects, as well as others, by the construction, combination and arrangement of parts illustrated in the drawings which form a part hereof.

Figure I is a side elevation of the tractor.

Fig. II is a plan view thereof with part of one tractor broken away.

Fig. III is an elevation of rear end showing paths of tractors.

Fig. IV is an elevation of forward end of device showing paths of wheels.

Fig. V is a front elevation showing paths of tractor and forward wheels, with different adjustment in relation to each other.

Fig. VI is a sectional view of transmission mechanism on line VI—VI of Fig. II.

Fig. VII is a front view of the device illustrating action of forward mechanism in unison with rear mechanism.

Like numerals refer to like parts in all figures.

The device has a chassis 7, provided with suitable power generating mechanism thereon and means to transmit power therefrom to the tractor wheels. A differential transmission mechanism is arranged in the casing 8 situated on the rear part of the chassis. A tractor drive shaft 9 extends transversely through the casing 8. On the respective ends of this shaft are the sleeve 11—11ª. Within the casing the sleeves have integral gears 14—14ª. The shaft extends through the sleeves which are mounted in bearings in the casing. Pinions 10—10ª are rigidly secured on the respective sleeves without the casing. The sleeve 11ª is keyed to the shaft 9 by key 12, while the sleeve 11 is rotatable on the shaft. Within the casing a clutch 13 is arranged about the shaft 9 in position to lock the sleeve 14 into integral engagement with the shaft 9. Means 13ª is arranged to operate the clutch 13.

Below the shaft 9 is a differential mechanism having intermediate means to receive transmission of power and to transmit the same to the gears 14—14ª. Longitudinal bars 16 are rotatably mounted on concentric bearing hubs 17 without the casing and inside of the pinions 10—10ª. The rear ends of the bars 16 are forked. Near the center of the bars 16 are formed integral, vertically extending quadrants 18 movable through guides 18ª rigidly secured on the sides of the casing 8. Within the intersections of the bars and quadrants short transverse wheel shafts 19 extend outwardly therefrom. On the ends of the shafts 19 tractor wheels 20 are rotatably mounted. The wheels 20 are provided with teeth 21, on the inner surface of the rims inside of the spokes, in position to engage the pinions 10—10ª. At the rear of the casing 8 is a transverse fulcrum bar 22 pivoted in its center on a pivot 23 extending from the casing. The ends of the bar 22 are slidable in the outward forked ends of the opposing quadrant bars 16. A vertical rod 24, threaded on its lower part, extends through a bearing 25 secured on the upper part of the casing 8, and through a pivoted and threaded bearing 26 on the fulcrum bar 22 to one side of its center. A hand wheel 27 is secured on the upper end of the rod 24.

At the forward end of the chassis three transverse parallel fulcrum bars 28 are arranged with a series of openings 29 in them. These bars are pivoted in one of the series of openings on pivots 30, extending outwardly from the front of the chassis. Vertical hanger bars 31 are pivoted in the ends of the fulcrum bars 28. Near the lower ends of the bars 31 horizontal shafts 32 extend outwardly. Forward wheels 33 are rotatably mounted on the shafts 32. In the lower ends of the bars 31 a transverse steering rod 34 is pivotally mounted at each of its ends. A steering rod 35 threaded on its lower part extends through a threaded bearing 36 which is secured in a steering arm 36ª. The rod 35 extends through a bearing in a standard 37 secured near the rear end of the casing 8 and has a hand wheel 38 on the rear end of the rod. A seat 39 is secured on the rear of the casing for the operator.

It will now be seen that the rear wheels may be vertically raised or lowered to different planes of travel with respect to each other, by operating the hand wheel 27, which causes the fulcrum bar 22 to adjust the wheels to any desired position for this purpose. It will also be observed that when the clutch 13 is not engaged, power is transmitted to the gears 14—14ª as ordinarily through a differential with usual compensation of movement on the part of the tractors. With the clutch engaged both tractor pinions act in unison and drive the tractors with the same load and without slipping.

It will also be seen that the forward wheels may be adjusted to the same path of travel as the tractors, or to one side thereof, by setting the forward fulcrum bars on the pivots in different series of the openings therein. This arrangement provides a means whereby the forward wheels automatically adjust themselves to the plane of travel of the tractor wheels and always in relation to them. In this way one forward wheel can be driven along and in a plow furrow while the opposite wheel and both tractor wheels travel on a surface plane at one side of the furrow, as shown in Fig. V. If it is desired to have one tractor and one forward wheel run in the furrow, an adjustment is made as shown in Fig. III. In all cases the operator can, as shown, adjust the tractors to any grade and the forward wheels automatically adjust themselves to that grade, and all the time the chassis is kept in a horizontal position. This enables the operator to preserve a steady draft on a plow and to keep it in good alinement on a grade when traveling over the same longitudinally.

It will be seen in Fig. VII that the chassis has been tilted to one side, and the tractor wheels have assumed a similar position at a like angle. The tilting thus shown is accomplished by the operation of the hand wheel 27 which has changed the position of the fulcrum bar 22 to make this result. It will be particularly noted that the forward wheels have at once automatically assumed a tilted position at a like angle, and are in correct alinement with the tractors. This is caused by the front fulcrum bar mechanism being arranged to allow them to do so. It will thus be seen that the one operation of the hand wheel 27 regulates all four wheels by the combination of the rear mechanism with the automatic mechanism forward and it is this combination which is new and useful.

Having described my invention I claim:—

A tractor of the character described having in combination, a chassis with rear tractor wheels and mechanism in and connected with the rear part of the chassis and said wheels, whereby the chassis and tractor wheels may be tilted to one side at a desired angle, and a series of transverse fulcrum bars pivotable laterally in varying positions on pivots located on the central part of the forward end of the chassis, said bars having hanger bars near each of their ends with wheel shafts extending outwardly therefrom, and wheels rotatably mounted on the wheel shafts, said forward mechanism being arranged and adapted to act automatically in unison with the operation of the aforesaid rear mechanism to cause the forward wheels contemporaneously to tilt at a same desired angle as that in which the rear wheels are caused to tilt, whether in alinement with them or in a different path of travel, substantially as described.

EDWIN G. ADAMS.

Witnesses:
W. T. VINTON,
ROSINA L. MILLER.